Patented Feb. 27, 1940

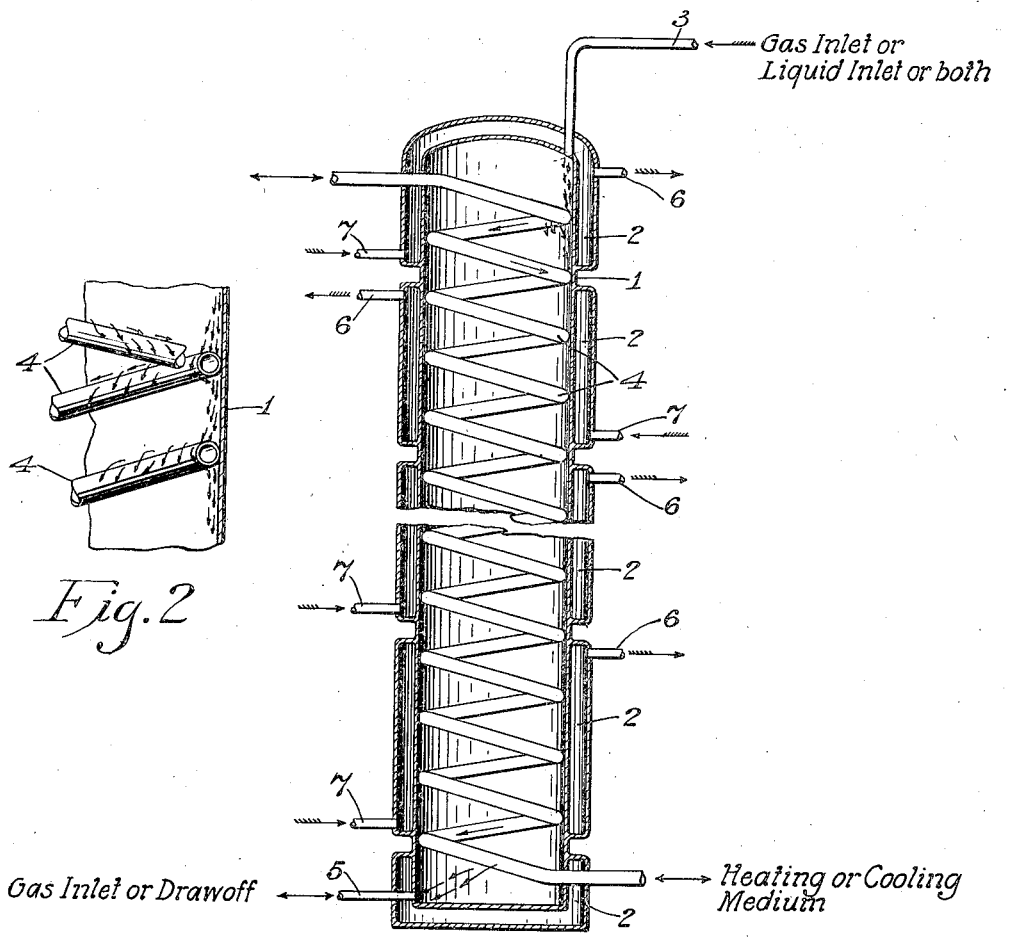

2,192,124

UNITED STATES PATENT OFFICE 2,192,124

CHEMICAL PROCESS AND APPARATUS

John L. Brill, Newark, Del., and Richard W. Plummer, Buenos Aires, Argentina, assignors to E. I. du Pont de Nemours & Company, Wilmington, Del., a corporation of Delaware Application February 24, 1937, Serial No. 127,382

6 Claims. (Cl. 23—1)

This invention relates to improvements in methods and apparatus of the type adapted for use in processes involving chemical reaction between liquids and gases and more particularly to such methods, and apparatus adapted therefor, when carried on at elevated temperatures and pressures.

In the construction of vessels for treating liquids with gases or for reaction therebetween, various constructions of baffles, checker work, and the like have been previously proposed for extending the liquid area and causing the liquids and gases to take a circuitous passage whereby to prolong their contact with one another. Such absorption and reaction towers and the like have many disadvantages such as relatively great expense in construction (particularly when for use at elevated pressures), resistance which they offer to the passage of gases, difficulty in, or absence of, temperature control at all portions of the reaction vessel, etc.

It has been proposed also to use a plurality of reaction vessels whereby the temperatures can be more easily and closely controlled and at the same time, extension made in the amount of gas-liquid contact and in the speed with which the reactions proceed. However, the very multiplicity of reaction vessels necessitates duplication of heat exchangers, control apparatus and the like, this in turn necessitating a relatively large investment and a considerable amount of space for the complete assembly.

It is an object of this invention to overcome these and similar disadvantages of the prior art and to produce a new and improved method of and apparatus for effecting chemical reaction of gases and liquids.

Other objects and advantages of the present invention will be apparent by reference to the following specification and accompanying drawing wherein its details and preferred embodiments are described and illustrated.

According to this invention high yields and greatly increased throughput may be obtained in liquid-gas reactions by an improved process in which is utilized, as a reaction vessel, an elongated tube, the length of the tube being from 50 to 1200 times the internal diameter thereof. Thus, for example, an elongated steel tube of one-half inch internal diameter and thirty feet height has been found to give highly satisfactory results in the synthesis of methyl formate from methanol and carbon monoxide. The ratio of length to diameter may be increased or lowered within the limits previously given without sacrificing the advantages of this invention. It has been found, however, that a relatively large ratio is preferable, and gives the best results if in the more limited range of about 200-450, the ratio of the length to the internal diameter.

As a preferred embodiment of this invention the reaction vessel is an elongated vertical tube of a length many times its diameter. At the top of such a vessel the liquid to undergo reaction is introduced and travels downwardly along the walls of the elongated vessel principally as a film of liquid while contacting gas which is introduced into the bottom, or simultaneously with the liquid, at the top of the vessel.

The speed with which chemical reactions between liquids and gases proceed is greatly affected by the degree of intimacy of contact between them, and as well by uniform maintenance of the optimum temperature for their reaction. The larger the area of liquid and hence the more overall contact between gas and liquid, the greater is the yield in reaction product per unit of time.

Due to its wetting of and spreading over the lengthy walls of the elongated tube a large area of liquid surface is available according to this invention for contact by the gaseous reactant, while at the same time the vertical speed of the liquid is in effect retarded due to its lengthy passage over the walls of the elongated tube resulting in a greatly extended time of contact of the liquid and gas.

Another of the advantageous features of this invention is the fact that the temperature of the reactants can be closely controlled and maintained in the optimum temperature range for the reaction, inasmuch as the film or stream of liquid flowing down the walls of the reaction vessel is in constant, intimate contact with the walls of the elongated reaction vessel through which, in turn, most efficient heat exchange can readily be effected. In the case of exothermic or endothermic gas-liquid reactions the tube of this invention is, therefore, preferably surrounded by a jacket or a plurality of jackets whereby the temperature of the tube may be controlled with precision at any or all points where heat is evolved or required, by cooling or heating, utilizing cooling water, steam or the like as desired. By means of such a preferred series of jackets a uniform or other predetermined gradient of temperature may be maintained throughout the length of the reaction vessel.

A still further advantage of the present invention resides in the fact that the cost of construction which has heretofore been almost prohibitive in equipment which would give an extended surface area of liquid for contact with gas to be reacted therewith, is avoided and a relative small expenditure is necessary to produce the reaction vessel of the present invention. Furthermore an increased time of contact of gas with liquid has been obtained without employing a multiplicity of vessels, recirculation or extended packing and baffling in order to create an extended area of liquid for contact with gas. Even further, a close control of the amount of gas dissolved in the liquid may be obtained due to the close control which it is possible to exert over the otherwise great variations in temperature at various parts of the apparatus. By exact maintenance of these temperatures, as above indicated, it is possible according to the present invention to carry out to equilibrium a reaction which is not favorably affected by low, and is favorably affected by high, temperatures. In other words, exact control of temperature which is obtained according to the present invention makes possible the carrying out of reactions under elevated temperatures and pressures, which it has been previously difficult if not impossible to carry out.

The process and apparatus of this invention is adaptable to gas-liquid reactions generally and, in the case of reactants which are ordinarily deleterious in their corrosive effect upon ferrous materials of construction, the apparatus can be fabricated or lined with whatever corrosion resistant materials may be desired, such, for example, as copper, the noble metals or alloys thereof, chromium-containing or stainless steel, or the like.

A preferred embodiment of the apparatus and its method of use according to this invention may be best understood by reference to the accompanying drawing as illustratively described hereinafter in connection with a process for the known synthesis of methyl formate from methanol and carbon monoxide.

Figure I is a sectional elevation of the apparatus of this invention comprising an elongated pressure resistant vertical tube 1 surrounded by jackets 2, and containing a helically formed close fitting coil 4. There are also shown, in Figure I, inlets 3 and outlets 5 to the vertical tube 1, as well as conduits 6 and 7 for inlet and outlet of tempering fluid to and from jackets 2.

Figure II is a cross sectional enlarged view of the wall 1 and coil 4 of Figure I, showing in detail the manner in which the liquid (represented by arrows) travels down the coil 4 and wall 1. Approximately the same type of flow is found if corrugations in the tube wall, rather than a coil, is used.

Into an elongated pressure-resistant vertical tube 1, surrounded by jackets 2 spaced therefrom, is introduced liquid methanol through inlet 3. The incoming methanol is directed into contact with the coil 4 (which may be solid or tubular) which is closely adherent to the walls of the tube 1 and whose convolutions it follows down the length of the vertical tube 1. Travelling down the sides of the vertical tube 1 by the lengthy, circuitous route formed by the helical coil 4 the methanol spreads over the spiral and the walls of the tube, thus presenting a large liquid surface for contact by gaseous carbon monoxide which is introduced also by way of inlet 3. The protracted travel of the liquid, combined with the large area thereof which is exposed to contact with the gas, accomplishes intimate contact of the gas and liquid which makes possible an extremely high rate of reactant throughput. The reaction between methanol and carbon monoxide is exothermic and the temperature within the reaction vessel, which otherwise might rise to an undesirable degree, is easily controlled by means of a regulated flow of the cooling water through the annular space between the jackets 2 which surround the reaction tube 1. If desired, the jackets 2, which are fitted with inlets 7 and outlets 6 and for cooling or heating water, or other temperature control medium, may be constructed as a single jacket, altho we prefer to utilize several separate jackets for easier control of the temperature. After completion of its passage down the length of the spiral core 4 the methanol is found, upon withdrawal of reaction product thru outlet 5, to have been converted to methyl formate to about 95% of that conversion theoretically possible.

Although, as a preferred embodiment, we have described the use of a helical coil, it has been found that circular bands, of corrugations, studs, and similar means for roughening the surfaces of the walls within the elongated tube give similarly advantageous results. The great area and lengthened time of contact between gas and liquid are accomplished, primarily, by the elongated vertical tube of small cross section (diameter) compared with its length and the redistributing or retarding packing or other means such as the coil simply add thereto.

We prefer to use a catalyst for this reaction and employ an alcoholate such as sodium alcoholate which is injected together with the methanol. The pressure utilized is elevated, preferably about 100–700 atmospheres, and the temperature of the reaction is also elevated, preferably about 125–150° C.

This particular process of alkyl formate synthesis, described, is only illustrative of the type of reaction for which the apparatus of this invention is adapted. It is equally well adapted for others and numerous similar reactions wherein it is desirable to obtain a maximum contact between gas and liquid and most advantageously where a catalyst is used which is gaseous or soluble in the liquid reactant. Thus, for example, this process and apparatus may be applied in the synthesis of formamide from ammonia and carbon monoxide, the synthesis of alkyl sulfuric acid or sulphate from sulfuric acid and olefine, the synthesis of acetic acid from methanol and carbon monoxide, propionic acid from ethanol and carbon monoxide, benzaldehyde from benzene and carbon monoxide, ketones from liquid hydrocarbons and carbon monoxide, and the like. All of these and similar reactions may be practiced, according to this invention, at ordinary, reduced, or superatmospheric pressure, as desired.

We claim:

1. An improved apparatus for chemical gas-liquid contact reactions which comprises a vertically disposed elongated cylindrical reaction vessel having a length of from 50–1200 times that of its internal diameter, means adapted for supplying reactants to the upper portion thereof, means adapted for supplying reactants to and removing reactants from the bottom portion thereof, means contiguous to the internal surfaces of the reaction vessel for retarding the vertical flow of liquid, and a series of sectional means for temperature control surrounding said reaction vessel.

2. An improved apparatus for chemical gas-liquid contact reactions which comprises an elongated cylindrical reaction vessel, means adapted for supplying reactants to the upper portion thereof, means adapted for supplying reactants to and removing reaction products from the bottom portion thereof, a helical coil within the reaction vessel having its turns in contact with the walls thereof, and a series of sectional means for temperature control surrounding said reaction vessel.

3. An improved apparatus for chemical gas-liquid contact reactions which comprises an elongated cylindrical reaction vessel, means adapted for supplying reactants to the upper portion thereof, means adapted for supplying reactants to and removing reaction products from the bottom portion thereof, a helical tubular coil within the reaction vessel having its turns in contact with the wall hereof, and a series of sectional means for temperature control surrounding said reaction vessel.

4. A process for effecting chemical reaction between materials at elevated temperatures and pressures, at least one of the materials being gaseous and one liquid at the desired temperature and pressure, which comprises passing a gaseous reactant through a vertically disposed elongated tubular reaction vessel having a length of from 50 to 1200 times that of its internal diameter and so small an unobstructed internal diameter that in passing the gas and liquid through in a continuous flow the path of the liquid is confined to a thin film on the interior wall of the tube while simultaneously introducing a liquid reactant at or near the top of the reaction vessel and withdrawing reaction products at or near the bottom thereof, the feed of gas and liquid being in such reactive quantities and at such rate that the liquid travels downwardly as a layer of liquid substantially uniformly covering the interior wall of the reaction vessel.

5. A process for effecting chemical reaction between materials at elevated temperatures and pressures, at least one of the materials being gaseous and one liquid at the desired temperature and pressure, which comprises passing a gaseous reactant through a vertically disposed elongated tubular reaction vessel having a length of from 200 to 450 times that of its internal diameter and so small an unobstructed internal diameter that in passing the gas and liquid through in a continuous flow the path of the liquid is confined to a thin film on the interior wall of the tube while simultaneously introducing a liquid reactant at nor near the top of the reaction vessel and withdrawing reaction products at or near the bottom thereof, the feed of gas and liquid being in such reactive quantities and at such rate that the liquid travels downwardly as a layer of liquid substantially uniformly covering the interior wall of the reaction vessel.

6. A process for effecting chemical reaction between materials at elevated temperatures and pressures, at least one of the materials being gaseous and one liquid at the desired temperature and pressure, which comprises passing a gaseous reactant through a vertically disposed elongated tubular reaction vessel having a length of from 50 to 1200 times that of its internal diameter and so small an unobstructed internal diameter that in passing the gas and liquid through in a continuous flow the path of the liquid is confined to a thin film on the interior wall of the tube and the internal walls of which have an irregular surface while simultaneously introducing a liquid reactant at or near the top of the reaction vessel and withdrawing reaction products at or near the bottom thereof, the feed of gas and liquid being in such reactive quantities and at such rate that the liquid travels downwardly as a layer of liquid substantially uniformly covering the interior wall of the reaction vessel.

JOHN L. BRILL.
RICHARD W. PLUMMER.